United States Patent Office 3,803,097
Patented Apr. 9, 1974

3,803,097
ANTIMONY OXALATE CATALYZED POLYESTER POLYCONDENSATION
Stanley D. Lazarus and Ian C. Twilley, Petersburg, Va., assignors to Allied Chemical Corporation, New York, N.Y.
No Drawing. Filed Feb. 5, 1968, Ser. No. 702,794
Int. Cl. C08g 17/015
U.S. Cl. 260—75 R 4 Claims

ABSTRACT OF THE DISCLOSURE

Polyesters having little or no discoloration are prepared by condensing diglycol:terephthalate ester intermediates including the modified esters and isomers thereof in the presence of 0.005 to 0.40 percent antimony oxalate based on the terephthalate content of the polymer employed. The process of this invention provides a means for obtaining colorless film and fiber-forming synthetic, linear polyesters having improved properties.

BACKGROUND OF THE INVENTION

The invention relates to a process of preparing colorless, linear high-molecular weight fiber-forming polyalkylene terephthalates and the copolymers thereof by direct esterification or by an ester interchange of at least one compound selected from the group consisting of (1) terephthalic acid, (2) the lower dialkyl esters of terephthalic acid, (3) the isomers of said acid or esters and mixtures thereof, or (4) a blend of at least one of these compounds with a minor amount, e.g., 0.1 to 10 percent by weight and preferably 1 to 5 percent, of a modified-terephthalic acid, a modified dialkyl ester or the isomers thereof with an alkylene glycol followed by condensation of the corresponding diglycol ester intermediates in the presence of a catalytic amount of antimony oxalate. The process of this invention provides a means of obtaining film and fiber-forming synthetic, linear polyesters with melting points of at least above 240° C. and in most cases above 250° C.

While there are a number of known catalysts including, for example, antimony trioxide, etc., which have been used primarily because of their improved catalytic effect and limiting polymer discoloration, there is still need for a catalyst capable of retarding color formed in the polyester, while at the same time maintaining all of the characteristics desired of a catalyst. The problem of darkening or color is particularly important when the polyesters are to be used as fibers in textiles and the like. Heretofore, various methods have been proposed to minimize or avoid color formation which have included, for example, the use of color inhibitors, e.g., phosphorous acid and the like. A number of these inhibitors, however, while being effective for deactivating the first-stage catalyst, which is partially responsible for the formation of color, are also responsible for other deleterious effects on the polymer including the catalytic side reactions which lead to the formation of ether linkages, etc. These ether linkages and the inhibitors per se, even though present in small amounts, are undesirable since they lower the melting point of the polyesters which limits their use and impairs their resistance to degradation caused by light, heat, and the like.

Thus, to avoid these and other problems, it has been found that improved high-molecular weight, linear polyalkylene terephthalates, e.g., polyethylene terephthalate, can be prepared which are substantially colorless and, therefore, eminently useful for the preparation of textile fibers. These polymers are obtained by condensing the diglycol terephthalate ester intermediate in the presence of an effective amount of antimony oxalate as the catalyst.

SUMMARY OF THE INVENTION

This invention is directed to a process for preparing colorless, linear, high-molecular weight polyalkylene terephthalates which comprises reacting either by direct esterification or by ester-interchange of an alkylene glycol having from 2 to 10 carbon atoms per molecule with at least one compound selected from the group consisting of (1) terephthalic acid, (2) the lower dialkyl esters of terephthalic acid, (3) the isomers of said terephthalic acid or dialkyl esters and mixtures thereof, or (4) a blend consisting essentially of one or more of these compounds with a minor amount, e.g., 0.1 to 10 percent but preferably 1 to 5 percent by weight, of a modified-terephthalic acid, such as sulfonated terephthalic acid. In addition to the modified terephthalic acids, it is obvious that other modified compounds including the modified dialkyl esters of terephthalic acid or the isomers of said esters and acids may be added to the blend in a small amount to change the characteristics of the final product, depending upon its ultimate use, e.g., to improve dyeability, etc. Although the polymers may be prepared by esterifying terephthalic acid and/or the lower alkyl diesters thereof, etc., with one or more glycols having 2 to 8 carbon atoms per molecule, it is preferred to use the lower molecular weight glycols having 2 to 4 methylene groups in that they result in highly polymerized esters having high melting points. These glycols include, for example, ethylene glycol, propylene glycol, butylene glycol and mixtures thereof.

In esterifying terephthalic acid or the lower dialkyl esters of terephthalic acid, etc., the glycols are present during the esterification in amounts ranging from about 1 to 4 molar equivalents of glycol per equivalent of the terephthalic acid or dialkyl ester, etc. The esterification of terephthalic acid may take place in the presence of various known catalysts, including, for example, hydrogen chloride, p-toluene sulfonic acid, etc. Likewise, the ester-interchange reaction between the glycols and the lower terephthalic acid dialkyl esters may be carried out with known catalysts, if desired, which may include, for example, metals such as sodium, potassium, aluminum, zinc, cobalt, manganese, silver, tin, bismuth, antimony, calcium and various other metals. Also metal salts such as zinc acetate, calcium acetate monohydrate and the like may be employed.

The first-stage reaction between the glycol and the terephthalic acid including the modified terephthalic acids and the isomers thereof may take place at temperatures ranging from about 190° C. to 300° C. either at atmospheric pressure or at pressures ranging up to about 250 p.s.i.g. but more preferably at pressures ranging from about 35 to 150 p.s.i.g. After the terephthalic acid and/or modified acids are esterified with the glycol, the temperature of the reaction mass is subsequently increased whereby the excess glycol, present during the esterification, is removed by distillation usually under reduced pressures. Alternatively, as indicated, the highly polymeric esters of this invention may be obtained by an ester-interchange of the glycol with the lower alkyl esters of the terephthalic acid, including the isomers and the esters of the modified acids which may include, for example, the lower molecular weight alkyl esters such as the methyl, ethyl, propyl, butyl, amyl or hexyl diesters of terephthalic acid, etc. Of these diesters, however, methyl terephthalate is preferred in that it is readily available and is less costly. To effect the ester-interchange, it is necessary to heat the reaction mixture above the boiling point of the alcohol to be displaced but not substantially above the boiling point of the glycol.

As indicated, the esterification reaction may take place with or without the presence of an ester-interchange catalyst and may include various alkali or alkaline earth metals and the metal salts. In the case of the alkali metals, for example, they may be used in the form of their corresponding alcoholates, e.g., sodium alcoholates, which may be obtained by reacting the alkali metal with an alcohol, such as ethyl or methyl alcohol. The intermediate or diglycol terephthalate ester is subsequently heated to temperatures ranging up to about 310° C. to remove the excess glycol, preferably under reduced atmospheric pressures, which facilitates the rapid distillation and removal of the glycol. The condensation or polymerization of the diglycol terephthalate ester takes place preferably under reduced atmospheric pressures ranging from about 20 to 0.01 mm. of mercury.

In preparing the linear, high-molecular weight colorless polyalkylene terephthalates contemplated by this invention, it is essential to use antimony oxalate in amounts ranging from about 0.005 to 0.40 percent by weight of the terephthalate radical content of the resulting polymer. Based on the weight of bis-2-hydroxy-ethyl terephthalate or polyester prepolymer, the antimony oxalate is present in an amount of from about 0.003% to about 0.25%. It has been found that although the antimony oxalate has little or no effect in promoting the ester-interchange or esterification reaction in the first stage, it likewise has no deleterious effect on said esterification reaction and, therefore, may be added during the initial stage together with an ester-interchange reaction catalyst, if desired. Unlike other catalysts, the antimony oxalate is soluble in the requisite quantities in the polyester-forming composition of both stages since it is soluble in an alkylene glycol.

The ester-interchange reaction may start at temperatures as low as 150° C. and range up to about 240° C. and preferably from 160° C. to 230° C. for periods from about 1 to 5 hours or more until the alcohol is removed. The polymerization or condensation of the intermediate diglycol terephthalate ester is then caried out at temperatures ranging from 200° C. to 310° C. and more preferably at temperatures ranging from about 225° C. to 310° C. or 240° C. to 280° C. under reduced pressure as low as 0.01 mm. of mercury. The condensation may be carried out under these conditions for periods ranging from 1 to 30 and more preferably from 2 to 10 hours until a polymerization product is obtained which may be characterized as having a reduced orthochlorophenol viscosity of at least 0.5. The duration of the condensation will depend obviously upon the size of the batch or upon the particular method being used, e.g., batch or continuous process. In the continuous polymerization process, for example, the polymerizing mass is agitated continuously to give maximum exposure to the vacuum which helps to remove the glycol as rapidly as possible. The condensation polymerization is preferably carried out under sub-atmospheric pressures and preferably in an inert atmosphere, e.g., nitrogen, or in the absence of oxygen or oxygen-containing gases. , The alkylene glycols having from 2 to 8 carbon atoms per molecule which may be used in preparing the polyesters of this invention include, for example, trimethylene glycol, ethylene glycol, tetramethylene glycol, hexamethylene glycol, heptamethylene glycol, decamethylene glycol, etc. When in the alternative the polyesters are prepared by reacting the lower dialkyl esters with the alkylene glycols, the esters may include, for example, the lower molecular weight alkyl esters such as the methyl, ethyl, butyl, or amyl esters of terephthalic acid, the isomers thereof and various other terephthalic acid derivatives capable of forming terephthalates under ester-interchange reaction conditions. As indicated the ester-interchange may take place at atmospheric pressure with temperatures ranging up to about 220° C. for periods ranging up to about 5 hours or more while the condensation reaction may take place over periods ranging from 1 to 30 hours. The actual reaction time however, will obviously vary depending upon the concentration of the catalyst, reaction temperatures, reaction pressures, and the viscosity desired of the final product.

As previously stated, to carry out the esterification reaction over a reasonable period, it may be necessary to use a first-stage catalyst, many of which have been found to be undesirable in that they have a tendency to degrade the polymer, causing discoloration. The purpose in using an ester-interchange catalyst in the first-stage of the reaction, however, is not only to achieve a rapid reaction rate but also to maintain a high quality product. These aims are often conflicting, however, in that catalysts which enable rapid reaction rates have a tendency to result in discolored products which are obviously unsatisfactory for the preparation of films, fibers, and similar products. Thus, it is apparent that the selection of the particular catalyst to be used in the first-stage reaction has in the past involved a compromise allowing for improved reaction rates while at the same time maintaining a high quality polymer.

In other words, it was usually necessary to use a first-stage catalyst in order to carry out the esterification reaction over a reasonable period of time. Some effective first-stage catalysts were also effective second-stage catalysts but all of this type caused undesirable degradation reactions and discoloration of the polymer. These first-stage catalysts have been used also in combination with various inhibitors and antimony catalysts, e.g., antimony oxide. This procedure involved inactivation of the first-stage catalyst by the inhibitor at the conclusion of the first-stage reaction followed by the addition of the antimony catalyst which was not affected by the inhibitor but which catalyzed the second-stage reaction without itself causing any significant degradation of the polymer. Unfortunately, however, all of the known antimony catalysts used heretofore for this purpose were readily reduced during the reaction to a black substance which caused a gray discoloration known as "antimony gray." Still there are other effective first-stage catalysts which do not cause significant discoloration or degradation, but these are not effective as catalysts for the second-stage reaction. These catalysts were often used also with an antimony compound as the second-stage catalyst. Here again, however, the problem of "antimony gray" discoloration was present.

It is these problems which the use of the antimony catalyst of this invention avoids in that antimony oxalate does not catalyze degradation in the polymers at the temperatures normally used in a spinning operation, e.g., spinning of fibers, etc. Moreover, the catalyst of this invention provides a high-rate of productivity, and permits the ester-interchange and condensation reactions to be carried out in two steps without any difficulties under routine conditions.

As an example, in accordance with this invention, ethylene glycol may be reacted with dimethyl terephthalate in molar proportions of glycol to terephthalate ranging from 1.1:1 to 4:1 and more preferably in molar ratios of 1.1:1 to 3:1. The first-stage ester-interchange reaction may take place at temperatures ranging up to about 220° C. in the presence of a catalyst, e.g., an alkali metal, an alkaline-earth metal or the salts thereof under atmospheric pressures. An ester-interchange catalyst, e.g., calcium acetate monohydrate, may be used in amounts ranging from 0.01 to 0.5 mole percent, based on the weight of the ethylene glycol, and more preferably in amounts ranging from 0.01 to 0.07 mole percent.

In the first-stage reaction, the ethylene glycol and the dialkyl ester of terephthalic acid are reacted until the intermediate bis-hydroxyethyl terephthalate is obtained. Condensation of this intermediate diglycol ester is then directly carried out with removal of glycol and is continued until the desired molecular weight is reached.

The polyesters produced in accordance with this invention will have a percent whiteness between 75 and 100, preferably greater than 90. The percent whiteness is determined herein in accordance with the procedure in Chemical Dyestuff Reporter 54, No. 7, pp. 246–51 (1965).

In the course of polymerization, other ingredients may be added for obtaining special properties in the polyester product. These ingredients include flame retardants, delustrants, antistatic agents, adhesion promoting agents, heat and light stabilizers, pigments, dyestuff precursors and assistants, fluorescent agents and brighteners, non-reactive and heterogeneous polymers, cross-linking agents, bacteriostats, and the like.

PREFERRED EMBODIMENTS

The following examples of preferred embodiments further illustrate the practice and principles of this invention and the best mode of carrying out the invention.

Example 1

Solid terephthalic acid, and ethylene glycol containing uniformly distributed therein 0.1 percent by weight antimony oxalate, are separately metered at a glycol: terephthalic acid mole ratio of 1.8:1 into a homogenizer which forms the ingredients into a smooth homogeneous transportable paste. This paste is fed by a piston pump to an esterification vessel, operating at 75 p.s.i.g. and 250° C. The water of reaction is withdrawn via a rectification column.

The material from the esterification vessel is then pumped to a flasher where the reaction mixture is contacted with a countercurrent of hot inert gas and the pressure reduced to one atmosphere. The esterified product is then metered to an agitated vessel operating at a temperature of 270° C. This reactor is fitted with glycol spray condensers where 80 percent of the theoretical amount of glycol is removed at 55 mm. Hg absolute pressure.

The melt from this reactor is discharged into a finisher vessel. The temperature is increased to 280° C. and the pressure reduced to 1 mm. Hg absolute pressure. The effluent polymer from the finisher has a percent whiteness of 93 and a reduced viscosity of 0.65. The polymer can be melt spun to form strong, uniform, high quality continuous fibers.

By way of comparison, the above example is repeated substituting an equivalent amount of antimony trioxide for antimony oxalate, all other conditions remaining unchanged. The resultant polymer has a percent whiteness of 64 and a reduced viscosity of 0.55. This serves to demonstrate the superiority of antimony oxalate as a catalyst in the production of less discolored polyethylene terephthalate.

Example 2

Zinc acetate dihydrate (0.10 pound) and antimony oxalate (0.11 pound) are uniformly mixed into 124 pounds of ethylene glycol at 20° C. The catalyst-glycol mixture is charged into an interchange reactor followed by 194 pounds of molten dimethyl terephthalate having a temperature of 150° C. to 220° C. over a period of five (5) hours with the evaporation of methanol and glycol. The methanol is continually withdrawn via a rectification column. The glycol is recycled to the reactor.

After the reaction is complete as indicated by the amount of condensed methanol recovered, the glycol recycle is stopped. The reaction temperature is now increased to 240° C., where 40 percent of the theoretical glycol is removed at atmospheric pressure. At this point, the product is transferred to an agitated polymerization kettle. There is then added 0.20 pound of an organic phosphite (Polygard, a product of Naugatuck Chemical Company) to deactivate the zinc catalyst, and the vacuum cycle is started and programmed such that 0.2 mm. Hg absolute pressure is reached in 45 minutes, while the temperature is increased from 240° to 275° C.

After four (4) hours under vacuum, the desired melt viscosity is attained. The agitation is stopped, vacuum broken with inert gas and pressure increased to 60 p.s.i.g. for extrusion. The extruded polymer has a percent whiteness of 91 and a reduced viscosity of 0.70.

The effectiveness of the antimony salts as polyalkylene terephthalate condensation catalysts in accordance with this invention can be seen by their resistance to reduction in the presence of a reducing agent (TNPP), trisnonylphenyl phosphite, in comparison to other known catalysts. Since it is the reduction of the metal during the polymerization process that is in part responsible for the discoloration of the polymer, it is essential that the catalyst be substantially resistant to reduction at polymerization temperatures, as indicated by comparing the following results:

| Antimony compounds: | Time for reduction (minutes) |
|---|---|
| Sb-triacetate | 7 |
| Sb-trioxide | 9 |
| Sb-oxalate | 20 |

It can be seen from the data above that the antimony oxalate of this invention has a higher stability toward reduction than the other most commonly known antimony compounds used heretofore in preparing polyalkylene terephthalates.

The polyesters obtained in accordance with this process utilizing oxalate as the catalyst for the condensation polymerization are especially adaptable for extrusion to highly transparent films, textile fibers, coatings and the like, which are useful in the wrapping and packaging industries.

While this invention has been described with respect to a number of specific embodiments, it is obvious that there are other variations and modifications which can be resorted to without departing from the spirit of the invention, as particularly pointed out in the appended claims.

What is claimed is:

1. A process of preparing a highly polymeric linear polyester which comprises polycondensing bis-2-hydroxyethyl terephthalate in the presence of antimony oxalate as a polycondensation catalyst, said antimony oxalate being present in an amount of from about 0.003% to about 0.25%, based on the weight of bis-2-hydroxyethyl terephthalate.

2. The process of claim 1 wherein the bis-2-hydroxyethyl terephthalate is polycondensed at temperatures ranging from about 225° C. to 310° C. until the polycondensation product has a reduced viscosity of at least about 0.5.

3. In a process of preparing polyethylene terephthalate wherein dimethyl terephthalate is reacted with ethylene glycol in the presence of an ester-interchange catalyst to form a polyester prepolymer or where terephthalic acid is reacted with ethylene glycol in the presence of a first stage catalytic additive to form a polyester prepolymer and where the resulting prepolymer is polycondensed in the presence of a polycondensation catalyst, the improvement comprising carrying out the polycondensation of the polyester prepolymer in the presence of antimony oxalate as a polycondensation catalyst, said antimony oxalate being present in an amount of from about 0.003% to about 0.25% based on the weight of polyester prepolymer.

4. The process of claim 3 wherein said polycondensation is carried out at temperatures ranging from about 225° C. to 310° C. until the polycondensation product has a reduced viscosity of at least about 0.5.

References Cited

UNITED STATES PATENTS

| 3,438,944 | 4/1969 | Stewart et al. | 260—75 |
| 2,850,483 | 9/1958 | Ballentine et al. | 260—75 |

FOREIGN PATENTS

| 795,968 | 6/1958 | Great Britain | 260—75 |

MELVIN GOLDSTEIN, Primary Examiner